US011936095B2

(12) United States Patent
Patel et al.

(10) Patent No.: US 11,936,095 B2
(45) Date of Patent: Mar. 19, 2024

(54) TELECOMMUNICATIONS ANTENNA MOUNTS AND ASSOCIATED TRANSITION COVERS

(71) Applicant: CommScope Technologies LLC, Hickory, NC (US)

(72) Inventors: Jignesh Patel, Plano, TX (US); Richard Williams, Wylie, TX (US)

(73) Assignee: CommScope Technologies LLC, Claremont, NC (US)

( * ) Notice: Subject to any disclaimer, the term of this patent is extended or adjusted under 35 U.S.C. 154(b) by 309 days.

(21) Appl. No.: 17/023,460

(22) Filed: Sep. 17, 2020

(65) Prior Publication Data

US 2021/0104807 A1 Apr. 8, 2021

Related U.S. Application Data

(60) Provisional application No. 62/911,661, filed on Oct. 7, 2019.

(51) Int. Cl.

*H01Q 1/20* (2006.01)
*E04H 12/22* (2006.01)
*H01Q 1/12* (2006.01)
*H01Q 1/22* (2006.01)

(52) U.S. Cl.

CPC ........... *H01Q 1/20* (2013.01); *E04H 12/2253* (2013.01); *H01Q 1/1228* (2013.01); *H01Q 1/22* (2013.01)

(58) Field of Classification Search

CPC .......... H01Q 1/20; H01Q 1/1228; H01Q 1/12; H01Q 1/1242; E04H 12/2253; E04H 12/24; E04H 12/2269; E04H 12/2284; E04H 12/085; E02D 5/80; E02D 5/801; E02D 5/223; E02D 5/54; E02D 5/56; E02D 27/42; E02D 27/16; E02D 27/425; F03D 11/04; F03D 11/045; E04C 3/30

See application file for complete search history.

(56) References Cited

U.S. PATENT DOCUMENTS 6,940,469 B2 * 9/2005 Gottl ...................... H01Q 1/246 343/890
8,593,370 B2 * 11/2013 Caldwell .............. H01Q 1/1242 343/890
9,433,034 B2 * 8/2016 Hendrix .................... H01Q 1/36
10,483,627 B2 * 11/2019 Maley .................. H01Q 21/205
10,627,042 B2 * 4/2020 Neighbor .............. E04B 1/1909

(Continued)

OTHER PUBLICATIONS

"International Search Report and Written Opinion corresponding to International Patent Application No. PCT/US2020/051158, dated Dec. 30, 2020".

*Primary Examiner* — Nkeisha Smith
(74) *Attorney, Agent, or Firm* — Myers Bigel, P.A.

(57) ABSTRACT

The present disclosure describes antenna mounts. An antenna mount may include a mount plate, a base plate, and at least three support members. The mount plate is configured to be secured to an antenna. The base plate configured to be secured to a mounting structure. The base plate may include one or more apertures, each aperture sized to receive a plurality of cables. Each support member has opposing ends with one end coupled to the base plate and the other end coupled to the mount plate such that the base plate and the mount plate are spaced apart a distance. Antenna mount assemblies and antenna mount transition covers are also provided.

15 Claims, 14 Drawing Sheets

(56) References Cited

U.S. PATENT DOCUMENTS

| | | | | |
|---|---|---|---|---|
| 10,826,154 | B2 * | 11/2020 | Matchett | H01Q 1/42 |
| 11,152,688 | B2 * | 10/2021 | Ahmed | H01Q 1/36 |
| 11,233,309 | B2 * | 1/2022 | Moheb | H01Q 3/08 |
| 2004/0080461 | A1 * | 4/2004 | Rothgeb | H01Q 1/424 343/720 |
| 2005/0030250 | A1 * | 2/2005 | Gottl | H01Q 1/42 343/878 |
| 2009/0217618 | A1 | 9/2009 | Cook et al. | |
| 2014/0110400 | A1 | 4/2014 | Swain et al. | |
| 2014/0240193 | A1 | 8/2014 | Caldwell et al. | |
| 2016/0017630 | A1 * | 1/2016 | Fairbairn | E04H 12/2253 52/299 |

* cited by examiner

TELECOMMUNICATIONS ANTENNA MOUNTS AND ASSOCIATED TRANSITION COVERS

RELATED APPLICATION(S)

The present application claims priority from and the benefit of U.S. Provisional Application Ser. No. 62/911,661, filed Oct. 7, 2019, the disclosure of which is hereby incorporated herein in its entirety.

FIELD

The present application is directed generally toward telecommunications equipment, and more particularly, telecommunications antenna mounts and antenna mount transition covers.

BACKGROUND

Many telecommunications antenna mounts need to support wind loads of up to 150 mph. As shown in FIG. 1, some current antenna mounts 10 include a center pipe 12 that supports most of the weight load. The center pipe 12 has a bottom opening 14 for routing radio frequency (RF) cables from an antenna to inside a mounting structure (e.g., a monopole). This can create a choking point for the cables, and in some instances, may not leave enough room for all of the cables coming from the antenna to be routed into the mounting structure. In addition, the center pipe 12 has opening(s) 16 along the side of the pipe 12, which can reduce the overall rigidity and strength of the antenna mount 10. There may be a need for an antenna mount design that provides for better cable management and improved routing flexibility of cables from the antenna to the mounting structure, while also improving the overall strength of the antenna mount.

Moreover, most of these antenna mounts 10 also include metal transition covers 20, 30 that are used to conceal the antenna mounts 10 and the cables running from the antenna to the mounting structure. Traditionally, these transition covers 20, 30 are made from welded pieces 22 (see, e.g., FIG. 2) or have a built-in joggle feature 32 (see, e.g., FIG. 3) to secure the covers 20, 30 around the antenna mounts/cables. Each of these securing methods requires additional design and/or engineering work. Thus, there may be a need for an antenna mount transition cover having a simplified design that reduces costs and allows for easy installation.

SUMMARY

A first aspect of the present invention is directed to an antenna mount. The antenna mount includes a mount plate, a base plate, and a plurality of support members. The mount plate is configured to be secured to an antenna. The base plate configured to be secured to a mounting structure. The base plate may include one or more apertures, each aperture sized to receive a plurality of cables. Each support member has opposing ends with one end coupled to the base plate and the other end coupled to the mount plate such that the base plate and the mount plate are spaced apart a distance.

Another aspect of the present invention is directed to an antenna mount assembly. The antenna mount assembly includes a mounting structure, an antenna, and an antenna mount. The antenna mount includes a mount plate, a base plate, and at least three support members. The base plate may include one or more apertures, each aperture sized to receive a plurality of cables. Each support member has opposing ends with one end coupled to the base plate and the other end coupled to the mount plate such that the base plate and the mount plate are spaced apart a distance. The antenna is secured to the mount plate and the base plate is secured to the mounting structure and the plurality of cables runs from the antenna through the one or more apertures in the base plate to the mounting structure.

Another aspect of the present invention is directed to an antenna mount transition cover. The antenna mount transition cover includes two or more segments. Each segment has a thickness in the range of about 0.05 inches to about 0.1 inches and an edge that overlaps the adjacent segment. The transition cover is configured to be secured to an antenna mount and is devoid of welding or a joggle feature.

Another aspect of the present invention is directed to an antenna mount assembly. The antenna mount assembly includes an antenna, a mounting structure, a plurality of cables routed from the antenna to the mounting structure, and an antenna mount. The antenna mount includes a mount plate, a base plate, and at least three support members. The base plate includes one or more apertures, each aperture sized to receive one or more of the cables. Each support member has opposing ends with one end being coupled to the base plate and the other end being coupled to the mount plate such that the base plate and the mount plate are spaced apart a distance sufficient to maintain the minimum bend radius of the plurality of cables. The antenna is secured to the mount plate and the base plate is secured to the mounting structure and the plurality of cables is routed from the antenna through the one or more apertures in the base plate and into the mounting structure.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
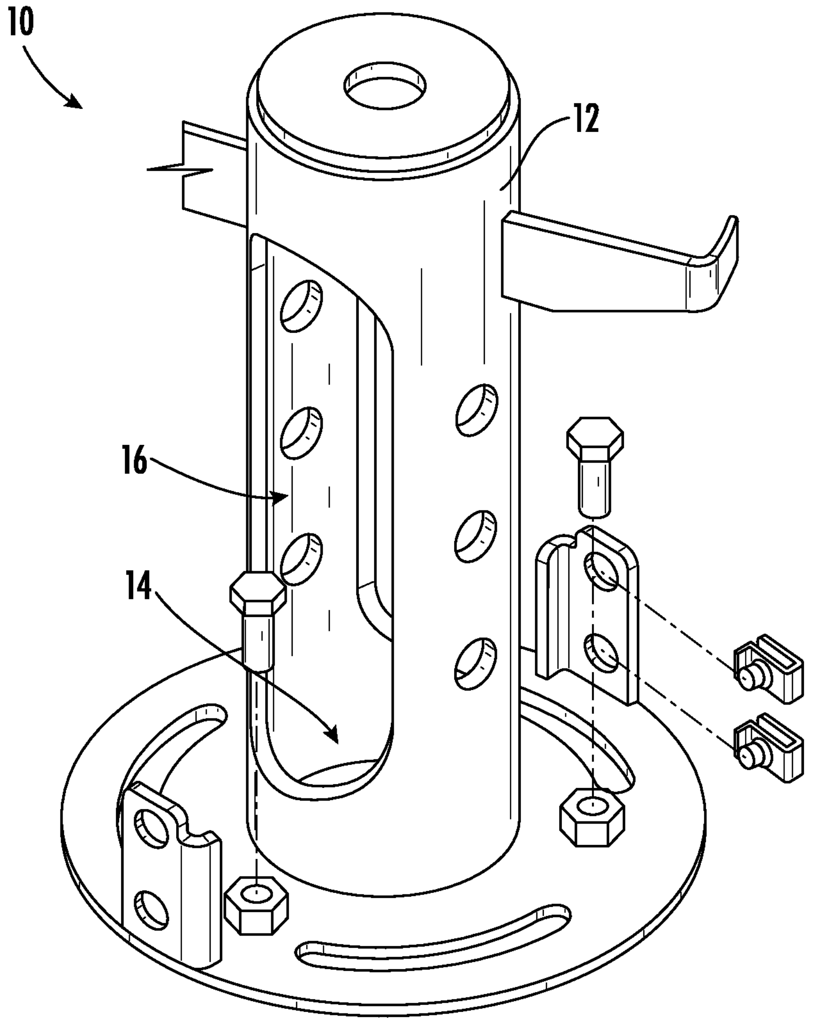
FIG. 1 (PRIOR ART)
FIG. 1 is a top perspective view of a prior art antenna mount.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10", 10'").

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Pursuant to embodiments of the present invention, antenna mounts are provided that may provide the ability for better cable management and routing flexibility of cables from the antenna to the mounting structure (e.g., a monopole). Antenna mount transition covers and antenna mount assemblies are also provided herein. Embodiments of the present invention will now be discussed in greater detail with reference to FIGS. 4A-9C.

Referring to FIGS. 4A-4D, an antenna mount 100 according to embodiments of the present invention is illustrated. In general, antenna mounts 100 of the present invention may comprise a mount plate 102, a base plate 104, and a plurality of support members 106.

Figure 6A:
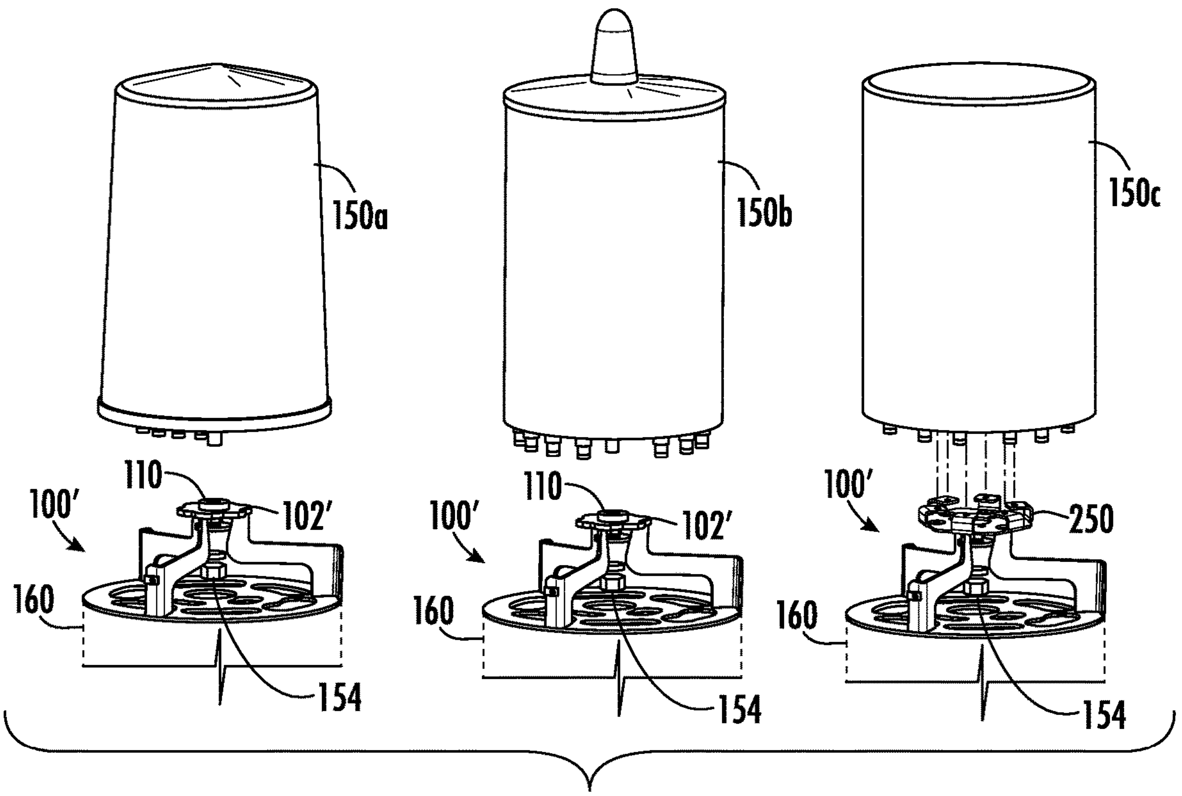
FIG. 6A illustrates the mounting of different types of antennas onto the antenna mount of FIG. 5A according to embodiments of the present invention.
Figure 6B:
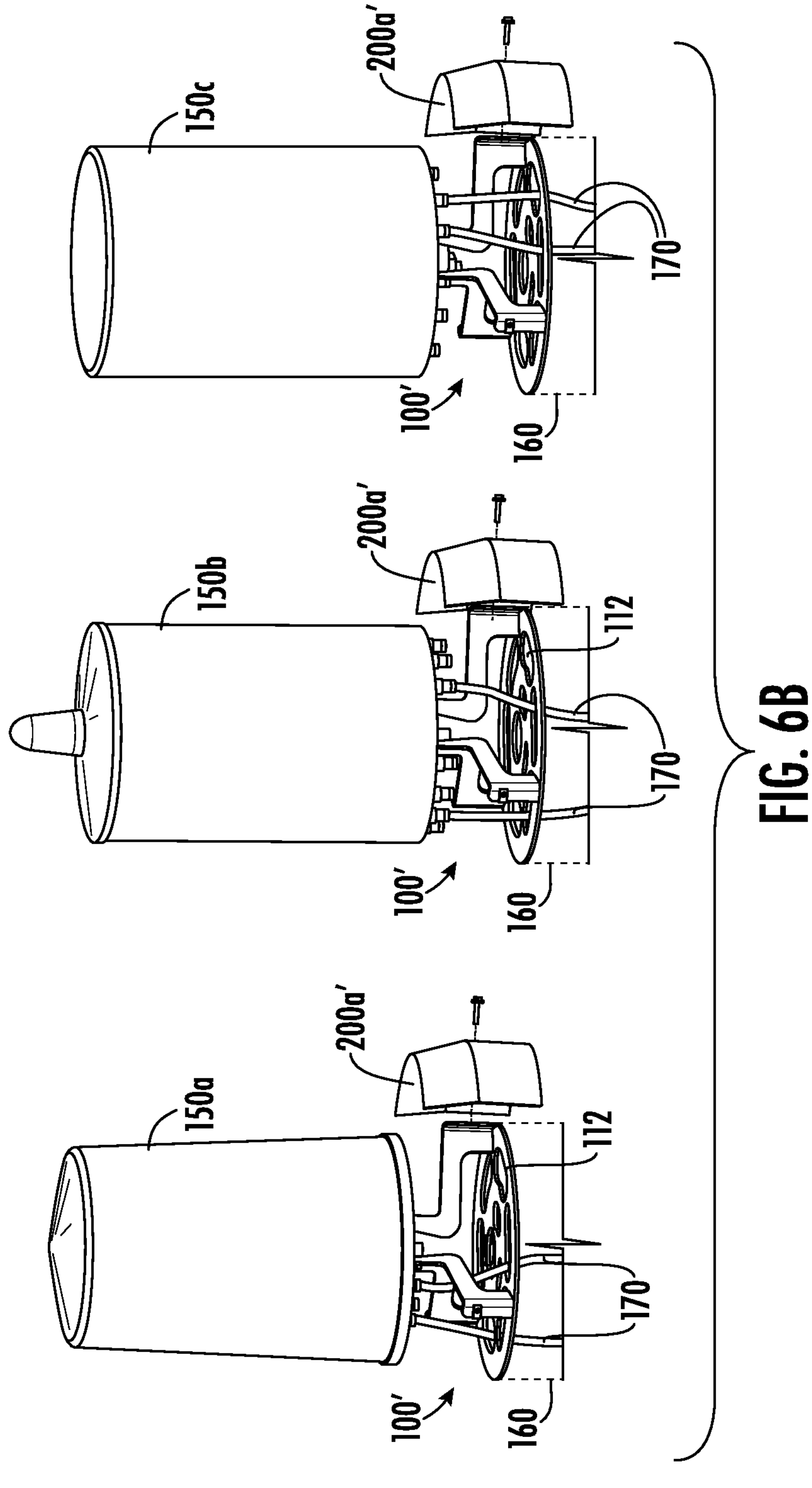
FIG. 6B illustrates the mounting of an antenna mount transition cover onto the antenna mounts shown in FIG. 6A.
Figure 6C:
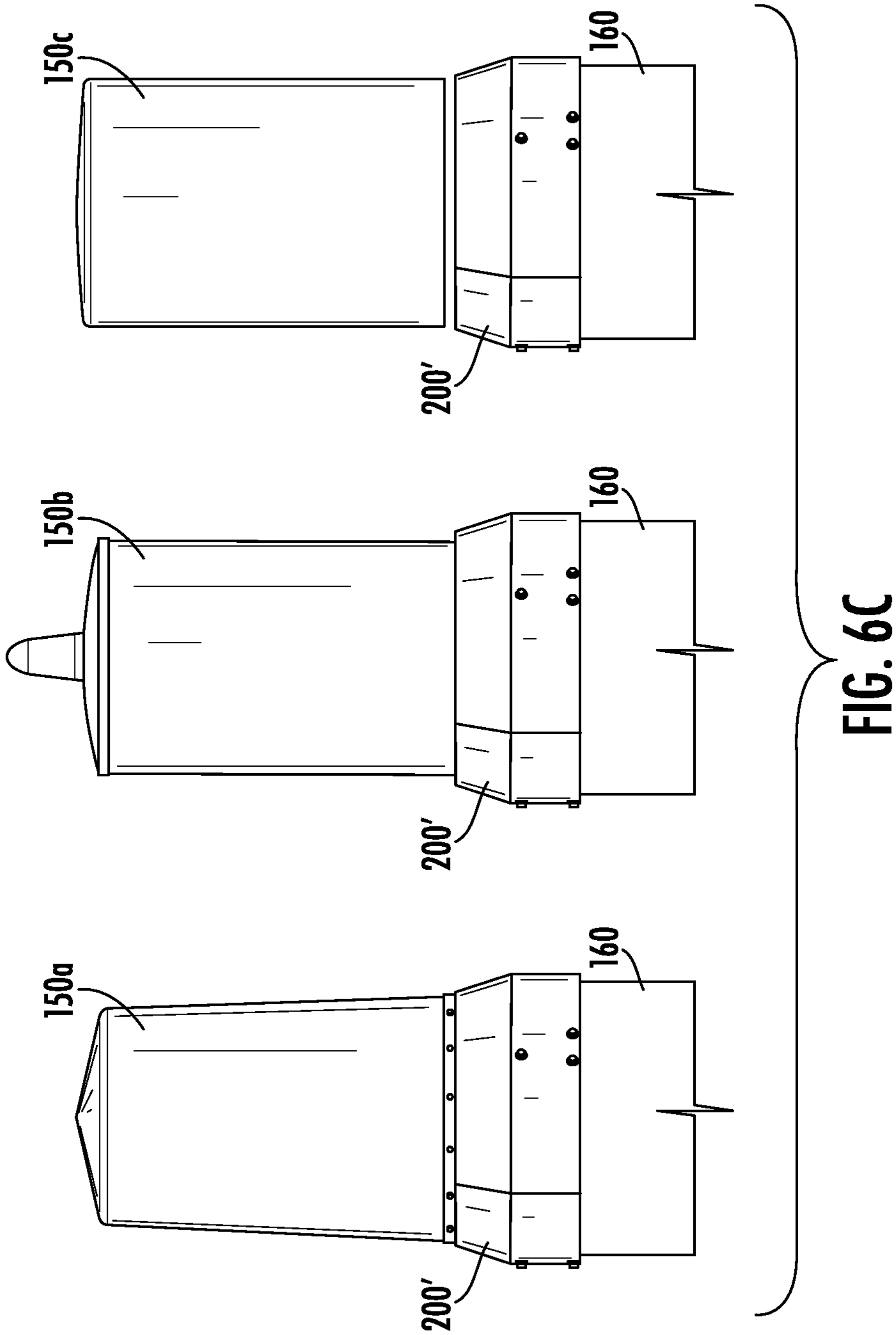
FIG. 6C illustrates the fully mounted transition cover on the different types of antennas shown in FIGS. 6A and 6B.

The mount plate 102 is configured to be secured to an antenna 150*a-c* (see, e.g., FIGS. 6A-6C). In some embodiments, the mount plate 102 comprises a plurality of mount apertures 108. In some embodiments, the mount plate 102 may comprise a larger aperture 110 located in the center of the mount plate 102.

As will be discussed in further detail below, in some embodiments, the apertures 108, 110 may be configured such that an antenna adapter bracket 250*a-d* may be used to mount an antenna 150*a-c* to the mount plate 102 (see, e.g., FIGS. 5B, 6A, 7B and 9A-9C). In some embodiments, each mount aperture 108 may align with a respective mount aperture 258 of an antenna adapter bracket 250*a-d* for a respective antenna 150*a-c* (see, e.g., FIG. 5B and FIG. 9A). The mount apertures 108, 258 are each sized and configured to receive a bolt 254 (see, e.g., FIG. 5B and FIG. 9A) to secure the adapter bracket 250*a-d* (and a respective antenna 150*a-c*) to the antenna mount 100. Like the mount apertures 108, the central aperture 110 is also configured to secure an antenna adapter bracket 250*a-d* or antenna 150*a-c* to the antenna mount 100. In some embodiments, the central aperture 110 aligns with a respective central aperture 256 of the adapter bracket 250*a-d* and each are sized and configured to receive a bolt 254. In some embodiments, the central aperture 110 is sized and configured to receive a bolt 154 secured directly to the antenna 150*a-c* (see, e.g., FIG. 6A).

Figure 7A:
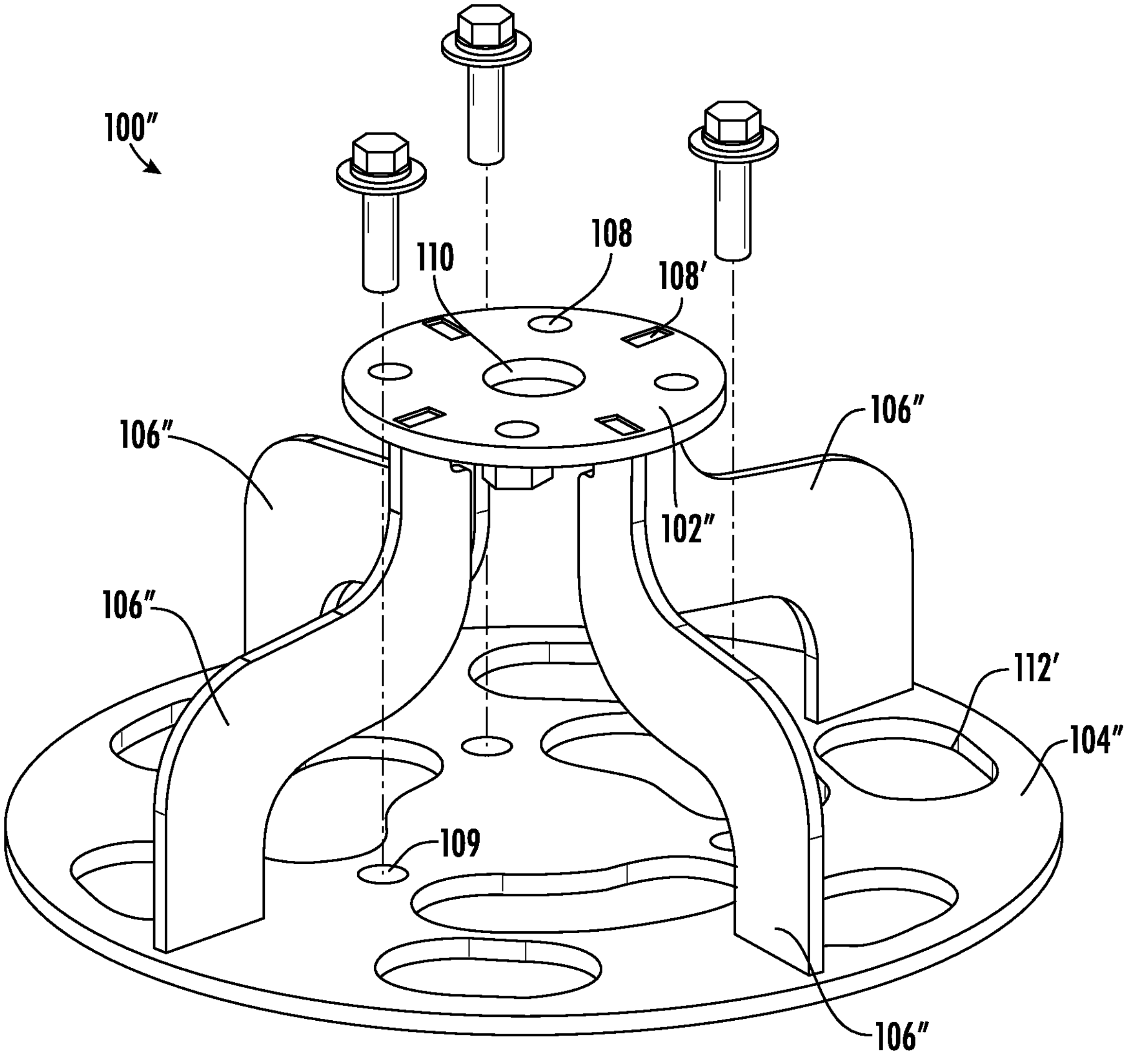
FIG. 7A is a top perspective view of another antenna mount according to embodiments of the present invention.
Figure 8A:
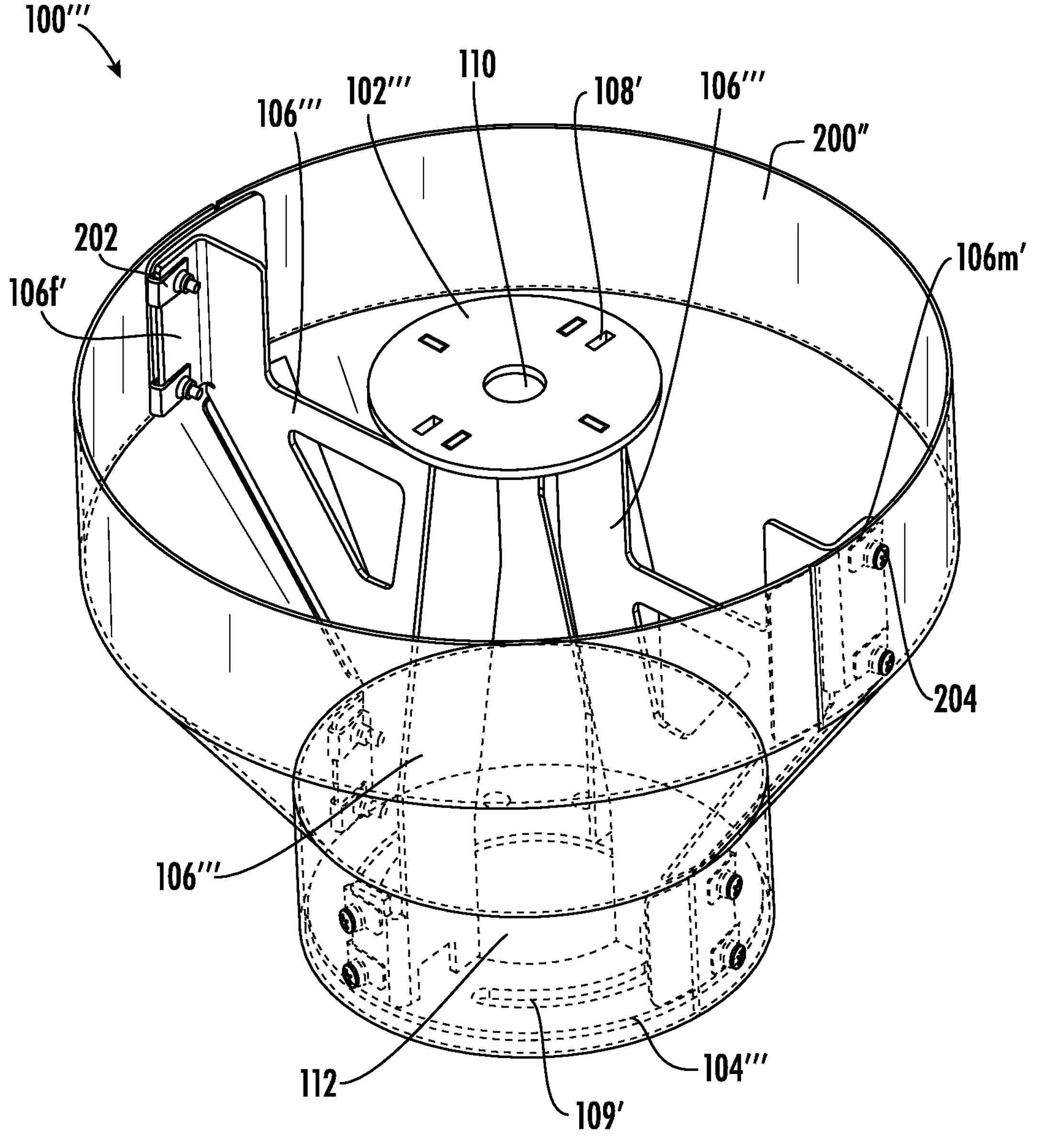
FIG. 8A is a top perspective view of another antenna mount and transition cover according to embodiments of the present invention.

The location of the apertures 108, 110 in the mount plate 102 may vary to allow for different types and sizes of antennas 150*a-c* to be secured to the antenna mount 100. The mount plate 102 may also have a variety of shapes and sizes which may allow for compatibility with a number of different types and sizes of antennas 150*a-c* (see, e.g., FIGS. 6A-6C). For example, in some embodiments, the shape of the mount plate 102 may be hexagonal (FIGS. 4A-4D), flower or star-shaped (FIGS. 5A-5B), or circular (FIG. 7A and FIG. 8A). The mount plate 102 may take any shape and is not limited to the shapes shown in the figures.

Figure 4A:
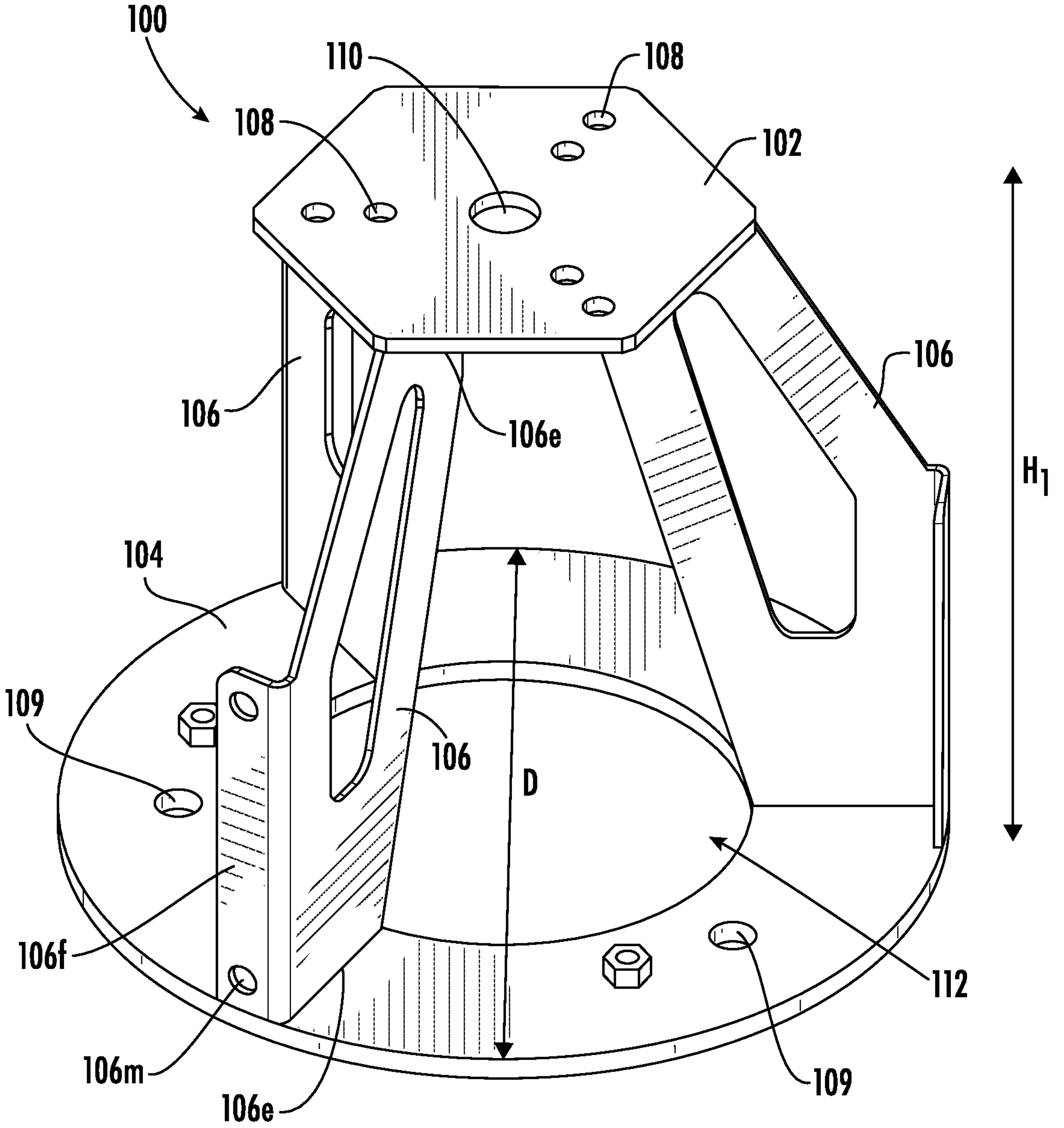
FIG. 4A is a top perspective view of an antenna mount according to embodiments of the present invention.
Figure 4B:
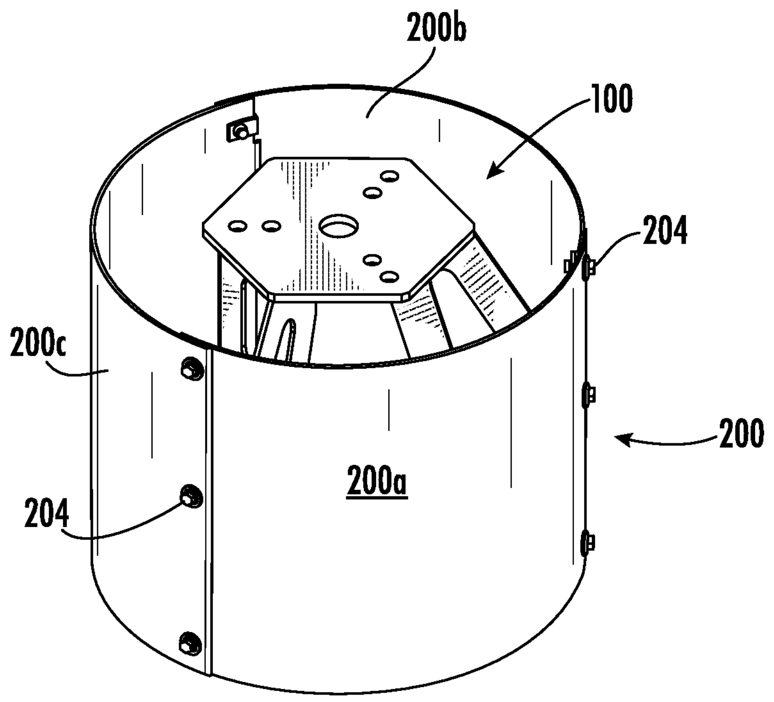
FIG. 4B is a top perspective view of the antenna mount of FIG. 4A with an antenna mount transition cover according to embodiments of the present invention.
Figure 4C:
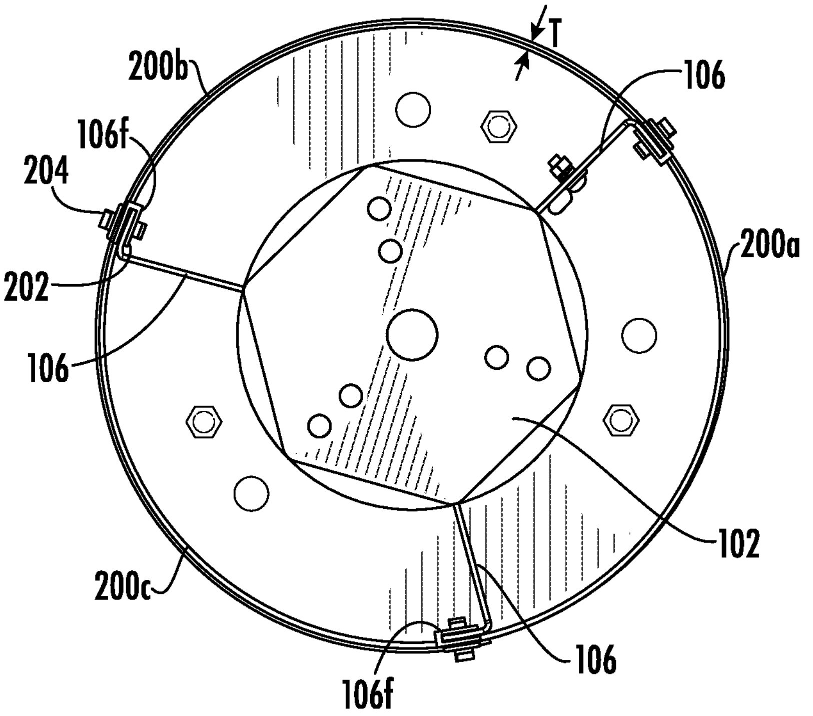
FIG. 4C is a top view of the antenna mount of FIG. 4B.
Figure 4D:
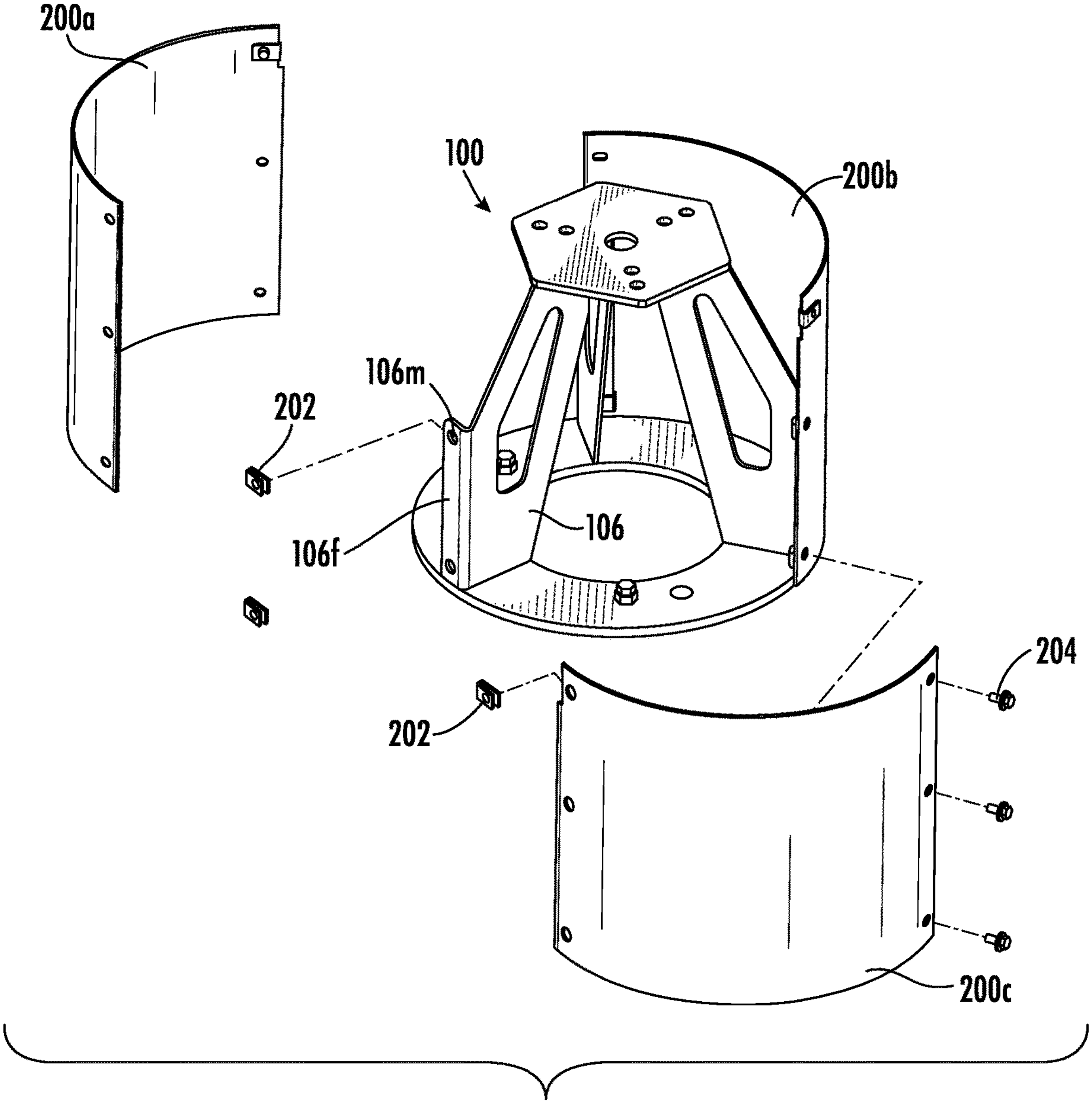
FIG. 4D is an exploded view of the antenna mount of FIG. 4B.

The base plate 104 is configured to be secured to a mounting structure 160 (see, e.g., FIG. 6C). In some embodiments, the mounting structure 160 is a monopole. As shown in FIGS. 4A and 4D, the base plate 104 may comprise one or more apertures 112. The one or more apertures 112 are sized such that one or more cables 170 attached to the antenna 150*a-c* (see, e.g., FIG. 6B) may easily run through the aperture(s) 112 into the mounting structure 160. As shown in FIG. 4A, in some embodiments, the base plate 104 may comprise one large aperture 112 sized such that multiple cables 170 may be run through the aperture 112 and into the mounting structure 160.

Similar to the mount plate 102, the base plate 104 also comprises a plurality of mount apertures 109. The mount apertures 109 are configured to secure the antenna mount 100 to the mounting structure 160. In general, the shape of the base plate 104 is circular and is sized to correspond with the diameter of the monopole (i.e., mounting structure 160). In some embodiments, the base plate 104 has a diameter D in the range of about 8 inches to about 18 inches. For example, in some embodiments, the base plate 104 has a diameter D of 12 inches or 18 inches. Note that the base plate 104 may be configured into a variety of different shapes and sizes to allow the antenna mount 100 to be secured to different types of mounting structures 160.

The antenna mount 100 comprises a plurality of support members 106. In some embodiments, an antenna mount 100 of the present invention comprises at least three support members 106 (see, e.g., FIG. 4A and FIG. 5A). In other embodiments, and discussed in further detail below, an antenna mount 100" of the present invention may comprise four support members 106 (see, e.g., FIG. 7A and FIG. 8A).

Each support member 106 has opposing ends 106*e*. One end 106*e* of each support member 106 is coupled to the mount plate 102 and the other end 106*e* is coupled to the base plate 104. As shown in FIG. 4A, in some embodiments, each support member 106 is coupled adjacent to the periphery of the base plate 104 surrounding the central aperture 110. The support members 106 provide space between the mount plate 102 (i.e., the antenna 150*a-c*) and the base plate 104 (i.e., the mounting structure 160). The mount plate 102 and the base plate 104 are spaced apart a sufficient distance to allow one or more cables 170 to be routed from the antenna 150*a-c* to the mounting structure 160 while also allowing for the minimum bend radius of the cables 170 to maintained. Thus, the space between the mount plate 102 and the base plate 104 may allow for better cable management and cable routing flexibility from the antenna 150*a-c* to the mounting structure 160.

In some embodiments, the mount plate 102 and the base plate 104 are spaced apart a distance equal to the height $H_1$ of the support members 106. In some embodiments, each support member 106 has a height $H_1$ in the range or about 6 inches to about 15 inches.

In some embodiments, each support member 106 may comprise a flange 106*f*. As shown in FIGS. 4B-4D, according to some embodiments, a transition cover 200 may be used to conceal the antenna mount 100 and the cables 170 routed from the antenna 150*a-c* to the mounting structure 160 (see, e.g., FIGS. 6B-6C). In some embodiments, a transition cover 200 of the present invention may comprise two or more segments 200*a-c*. The transition cover 200 is comprises a thin material. For example, in some embodiments, the segments 200*a-c* may be formed from metal sheets having a thickness T in the range of about 0.05 inches to about 0.1 inches. The flange 106*f* of each support member 106 may be configured to secure each segment 200*a-c* of the transition cover 200 to the antenna mount 100.

Figure 2:
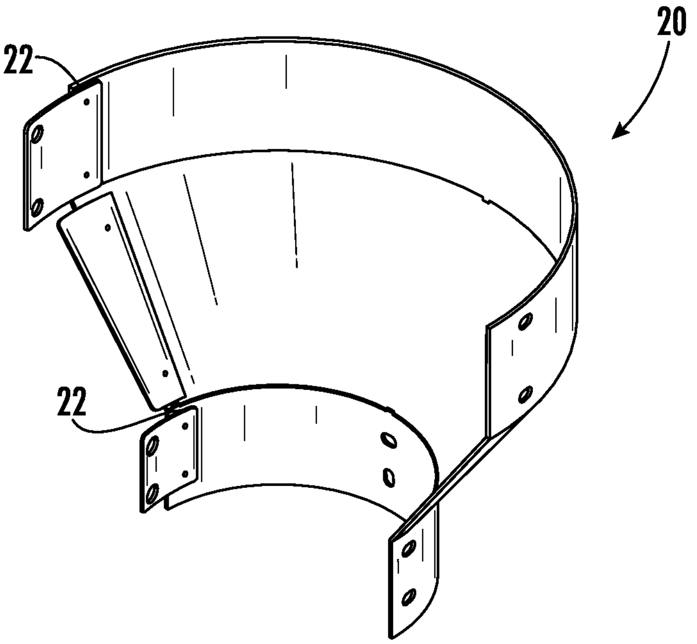
FIG. 2 (PRIOR ART)
FIG. 2 is a cross-sectional view of a prior art antenna mount transition cover.
Figure 3:
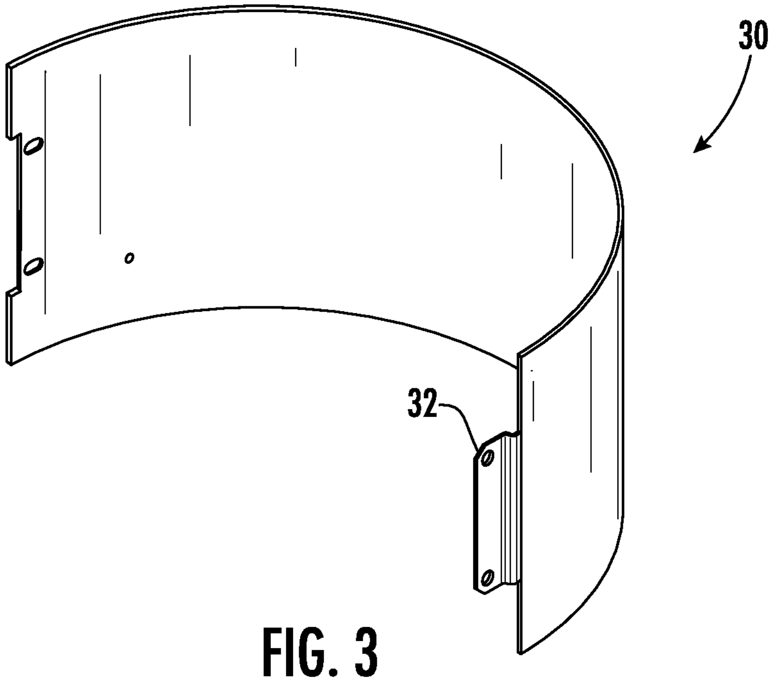
FIG. 3 (PRIOR ART)
FIG. 3 is a cross-section view of another prior art antenna mount transition cover.

For example, as shown in FIG. 4D, clip nuts 202 may be used to secure each segment 200*a-c* to the flanges 106*f* of the support members 106. Note that other known methods of fastening the segments 200*a-c* of the transition cover 200 to the antenna mount 100 may be used. As shown in FIG. 4B and FIG. 4C, each cover segment 200*a-c* overlaps an adjacent cover segment 200*a-c*. A bolt 204 is received through a clip nut 202 and a respective mounting aperture 106*m* in the flange 106*f* to secure the transition cover 200 to the antenna mount 100. Thus, unlike known transition covers 20, 30, the transition cover 200 of the present invention is devoid of welding 22 or joggle features 32 (e.g., shown in FIG. 2 and FIG. 3), thereby providing a simplified design that may reduce costs and allow for easy installation.

Figure 5A:
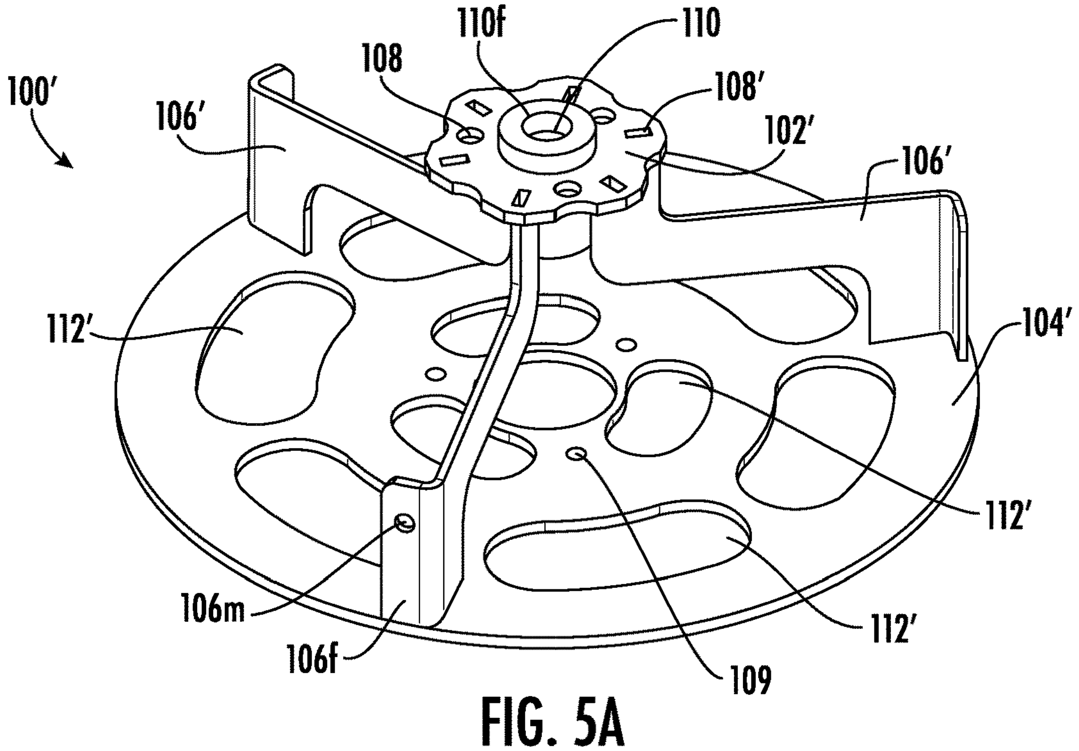
FIG. 5A is a top perspective view of another antenna mount according to embodiments of the present invention.
Figure 5B:
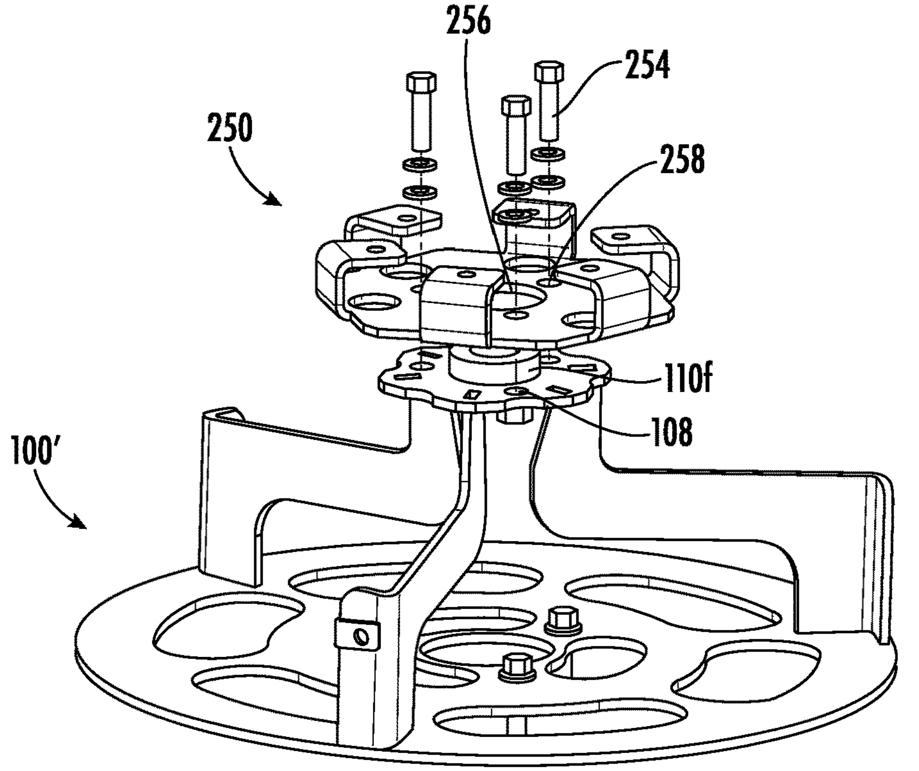
FIG. 5B is an exploded view of the antenna mount of FIG. 5A and an antenna adapter bracket.

Referring now to FIGS. 5A-5B, another antenna mount 100' according to embodiments of the present invention is illustrated. Properties and/or features of the antenna mount 100' may be as described above in reference to FIGS. 4A-4C and duplicate discussion thereof may be omitted herein for the purposes of discussing FIGS. 5A-5B. Like antenna mount 100 discussed above, antenna mount 100' comprises a mount plate 102', a base plate 104', and a plurality of support members 106'.

As shown in FIG. 5A, the mount plate 102' has a flower or star shape and comprises a central aperture 110 and a plurality of mount apertures 108. As discussed above, different types or sizes of antennas 150*a-c* may be secured to the antenna mounts 100, 100' of the present invention (see, e.g., FIG. 6A). In some embodiments, the mount apertures 108 may comprise slots 108' which provide flexibility for securing different types of antennas 150*a-c* to the antenna mount 100'. In some embodiments, one or more of the slots 108' may also be configured to secure the support members 106' to the mount plate 102'.

As discussed above, and shown in FIG. 5B, in some embodiments, an adapter bracket 250 may be used to assist in securing an antenna 150*a-c* to the antenna mount 100, 100' (see also, e.g., FIGS. 6A, 7B, and 9A-9C). In some embodiments, the mount plate 102' of the antenna mount 100' may comprise a circular flange 110*f* that extends outwardly from the mount plate 102' and surrounds the central aperture 110. The flange 110*f* may be configured such that it may be received by an adapter bracket 250. For example, as shown in FIG. 5B, in some embodiments, an adapter bracket 250 may comprise mount apertures 258 that align with the mount apertures 108 in the mount plate 102'. The adapter bracket 250 may be secured to the mount plate 102' via bolts 254 received through the aligned mount apertures 108, 258.

Still referring to FIGS. 5A-5B, in some embodiments, the base plate 104' of antenna mount 100' may comprise more than one aperture 112'. Each aperture 112' may be configured and sized to allow one or more cables 170 to run from an antenna 150*a-c* through the aperture(s) 112' to the mounting structure 160. As shown in FIGS. 5A-5B, in some embodiments, the apertures 112' may be bean-shaped. Similar to antenna mount 100, the base plate 104' of antenna mount 100' also comprises a plurality of mount apertures 109 that are configured to secure the antenna mount 100' to a mounting structure 160.

In some embodiments, the antenna mount 100' of the present invention may comprise three support members 106', each support member 106' being coupled to the mount plate 102' and the base plate 104'. Like support members 106 discussed above, support members 106' may each comprise a flange **106*f* configured to secure a transition cover 200' of the present invention to the antenna mount 100' (see, e.g., FIG. 6B and FIG. 6**C).

FIGS. 6A-6C illustrate how different types of antennas **150*a-c* may be mounted onto the antenna mount 100' of the present invention. Note that different types of antennas 150*a-c* may be mounted in a similar manner to the other antenna mounts 100, 100", 100'" of the present invention described herein. FIG. 6A illustrates three different antennas 150*a*, 150*b*, 150*c* being mounted and secured to the antenna mount 100'. In some embodiments, an adapter bracket 250 may not be needed to secure an antenna 150*a-c* to an antenna mount 100, 100', 100", 100'" of the present invention. As shown in FIG. 6A, antennas 150*a* and 150*b* are secured directly to the antenna mount 100' via a bolt 154 that is received through the central aperture 110 of the mount plate 102'. The third antenna 150*c*, on the other hand, utilizes an adapter bracket 250 described above to secure the antenna 150*c* to the antenna mount 100'. As shown in FIG. 6B, after the antenna 150*a-c* is secured to the antenna mount 100', each segment 200*a-c* of a transition cover 200' may be mounted and secured to the antenna mount 100'. FIG. 6C illustrates the mounted transition cover 200' fully concealing the antenna mount 100' and the cable(s) 170 running from each antenna 150*a-c* to their respective mounting structure 160**.

Figure 7B:
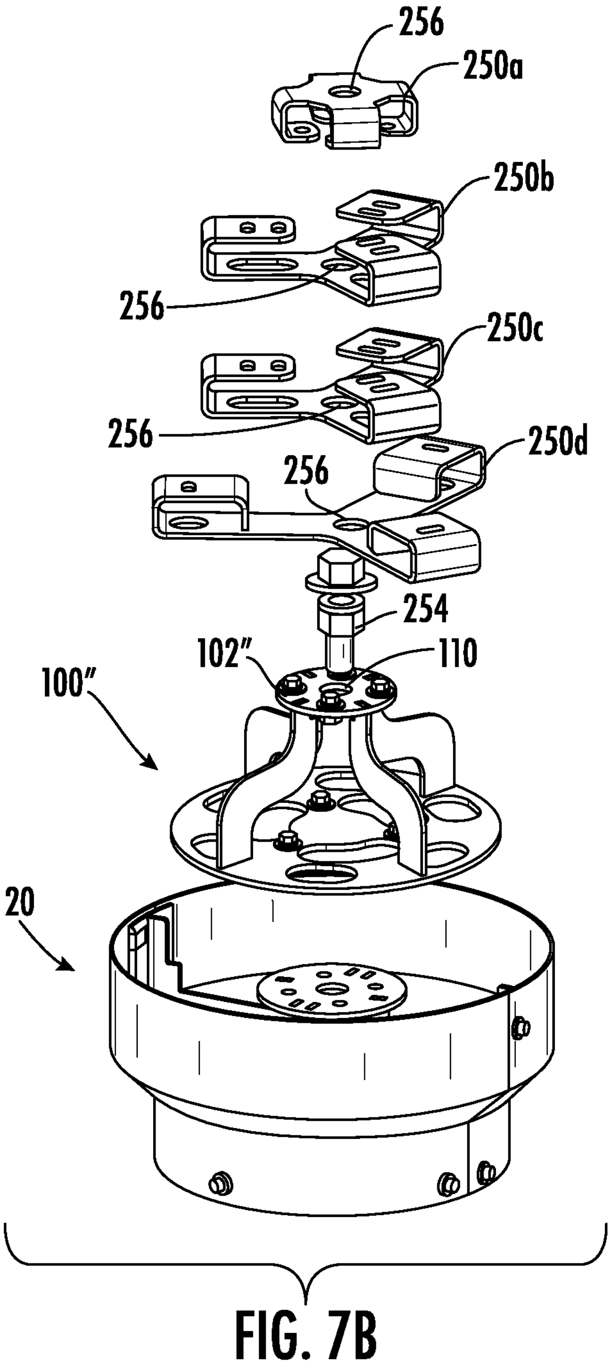
FIG. 7B is an exploded view illustrating different antenna adapter brackets that may be used with the antenna mount of FIG. 7A.

Referring now to FIGS. 7A-7B, another antenna mount 100" according to embodiments of the present invention is illustrated. Properties and/or features of antenna mount 100" may be as described above in reference to FIGS. 4A-6C and duplicate discussion thereof may be omitted herein for the purposes of discussing FIGS. 7A-7B. Like antenna mounts 100, 100' described above, antenna mount 100" comprises a mount plate 102", a base plate 104", and a plurality of support members 106". As shown in FIG. 7A, antenna mount 100" differs from antenna mount 100' in that antenna mount 100" comprises four support members 106" and the mount plate 102" is circular in shape.

FIG. 7B illustrates that a variety of different antenna adapter brackets **250*a-d* may be used with the antenna mount 100" of the present invention, thereby allowing different types and sizes of antennas 150*a-c* to be mounted and secured to the antenna mount 100". Each adapter bracket 250*a-d* has a central aperture 256 that aligns with the central aperture 110 of the mount plate 104". Both central apertures 110, 256 are sized to receive a bolt 254 which secures the adapter bracket 250*a-d* to the antenna mount 100" when the central apertures 110, 256 are aligned. While FIG. 7B shows transition cover 20 being used with the antenna mount 100", the support members 106" of antenna mount 100" can easily be replaced with support members 106' as described above (i.e., comprising flanges 106*f*) such that a transition cover 200, 200'** of the present invention may be secured thereto.

Referring now to FIGS. 8A-9C, another antenna mount 100'" according to embodiments of the present invention is illustrated. Properties and/or features of antenna mount 100'" may be as described above in reference to FIGS. 4A-7B and duplicate discussion thereof may be omitted herein for the purposes of discussing FIGS. 8A-9C.

Like antenna mounts 100, 100', 100" described above, antenna mount 100'" comprises a mount plate 102'", a base plate 104'", and a plurality of support members 106'". As shown in FIG. 8A, the mount plate 102'" comprises a central aperture 110 and slotted mount apertures 108'. The mount plate 102'" is circular in shape. In some embodiments, the antenna mount 100'" may comprise four support members 106'". Similar to antenna mount 100, the base plate 104'" comprises one large aperture 112 located in the center of the base plate 104'". The aperture 112 sized such that one or more cables 170 may be run through the aperture 112 to the mounting structure 160. The base plate 104'" also comprises a plurality of mount apertures 109'. In some embodiments, the mount apertures 109' may comprise elongated slots extending circumferentially around the large central aperture 112. The elongated slotted mount apertures 109' in the base plate 104'" may provide additional flexibility for securing the antenna mount 100'" to different mounting structures 160.

Figure 8B:
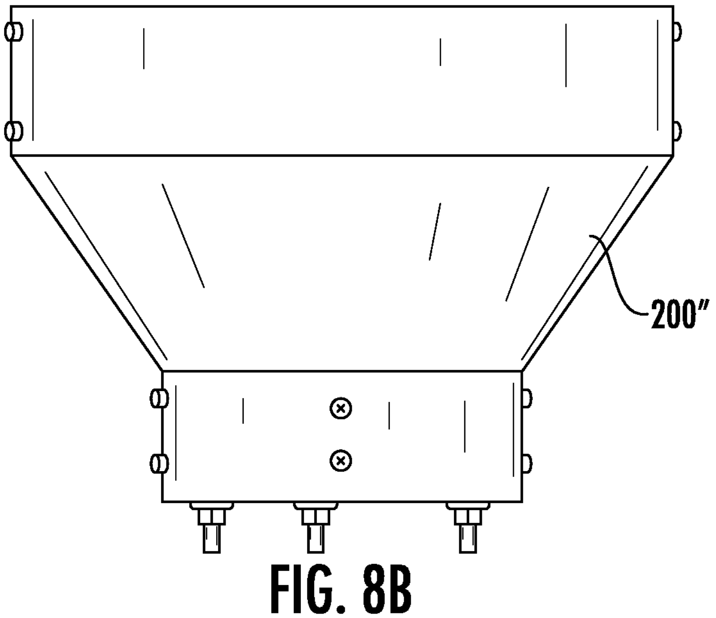
FIG. 8B is a side view of the antenna mount and transition cover of FIG. 8A.

A transition cover 200'" of the present invention may be used to conceal the antenna mount 100'" and cables running from the antenna **150*a-c* to the mounting structure 160. As shown in FIGS. 8A-8B, the transition cover 200'" corresponds to the profile of the antenna mount 100'". Like transition covers 200, 200' described above, cover segments 200*a*", 200*b*" of transition cover 200'" overlap each other (see, e.g., FIGS. 9A-9C). A bolt 204 is received through a respective clip nut 202 and a respective mounting aperture 106*m*' in the flange 106*f* to secure the transition cover 200" to the antenna mount 100'". Thus, unlike transition covers 20, 30, the transition cover 200'" of the present invention is devoid of welding 22 or joggle features 32**.

Figure 9A:
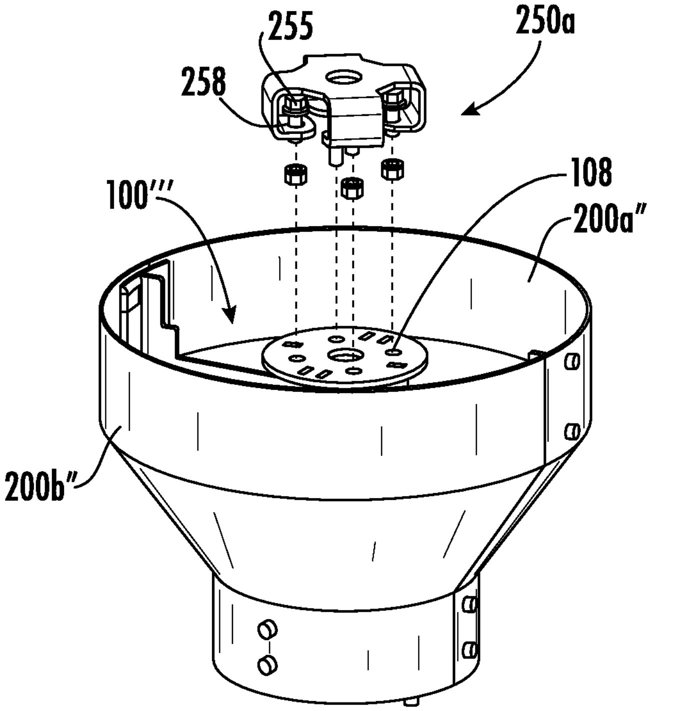
FIGS. 9A-9C are exploded views illustrating different antenna adapter brackets that may be used with the antenna mount of FIG. 8A.
Figure 9B:
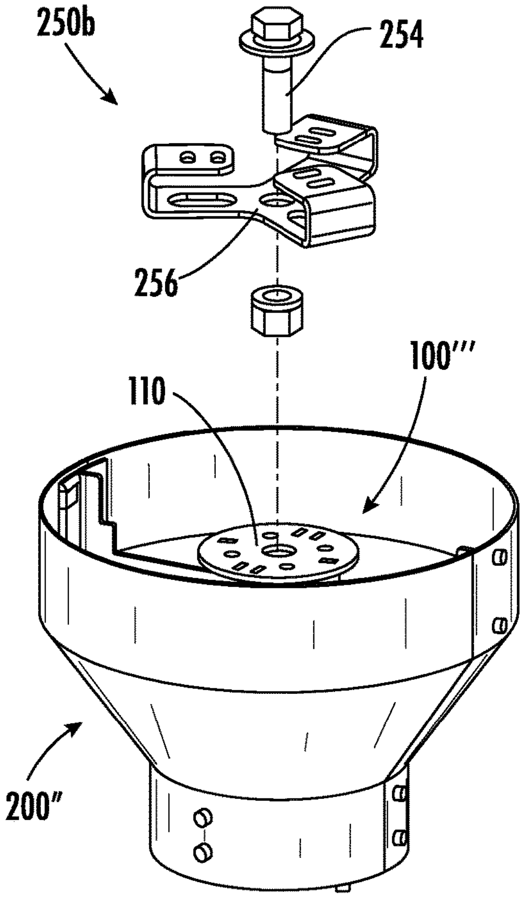
Figure 9C:
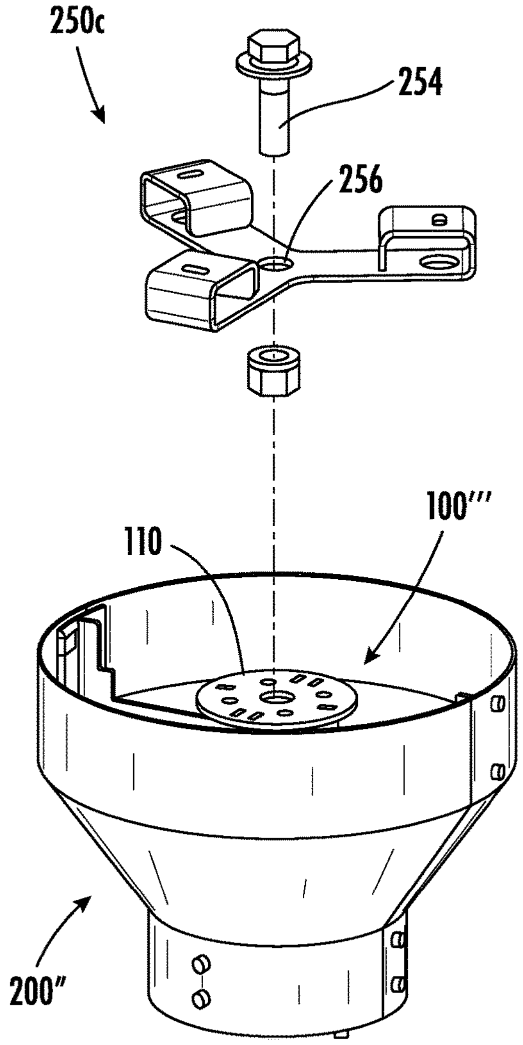

As shown in FIGS. 9A-9C, like antenna mount 100", a variety of different adapter brackets **250*a-c* may be used with the antenna mount 100'", and thereby allows different types and/or sizes of antennas 150*a-c* to be mounted and secured to the antenna mount 100'". Similar to adapter brackets 250*a-d* described above, in some embodiments, each adapter bracket 250*a-c* may have a central aperture 256 that aligns with the central aperture 110 of the mount plate 104'". Both central apertures 256, 110 are sized to receive a bolt 254 which secures the adapter bracket 250*a-c* to the antenna mount 100'" when the apertures 110, 256 are aligned. In some embodiments, an adapter bracket 250*a* may have additional mount apertures 258 that align with the mount apertures 108 in the mount plate 104'". The mount apertures 108, 258 are each sized to receive a bolt 255 which secures the adapter bracket 250*a* to the antenna mount 100'"**.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An antenna mount, comprising:

a mount plate configured to be secured to an antenna;

a base plate configured to be secured to a mounting structure, the base plate comprising one or more apertures, each aperture sized to receive a one or more cables extending from the antenna to the mounting structure;

at least three support members, each support member having opposing ends, wherein one end is permanently coupled to the base plate and the other end is permanently coupled to the mount plate such that the base plate and the mount plate are spaced apart a distance, and wherein each support member comprises a flange configured to have at least a portion of a transition cover secured thereto; and a transition cover surrounding the plurality of support members, wherein the transition cover comprises at least three segments, an edge of each segment overlaps an adjacent segment.

2. The antenna mount of claim 1, wherein the mount plate comprises a central aperture and a plurality of mount apertures residing circumferentially around the central aperture, the central aperture and mount apertures configured for securing the antenna to the antenna mount.

3. The antenna mount of claim 2, wherein the plurality of mount apertures comprises slots extending in a direction that is radial from the central aperture.

4. The antenna mount of claim 1, wherein the base plate comprises:

a central aperture sized to receive one or more cables extending from the antenna; and one or more elongated slots residing circumferentially around the central aperture configured for securing the antenna mount to the mounting structure.

5. The antenna mount of claim 1, wherein the transition cover is devoid of welding or a joggle feature.

6. The antenna mount of claim 1, wherein the transition cover has a thickness in the range of about 0.05 inches to about 0.1 inches.

7. The antenna mount of claim 1, wherein the base plate has a diameter in a range of about 8 inches to about 18 inches.

8. The antenna mount of claim 1, wherein the distance between the base plate and the mount plate is in a range of about 6 inches to about 15 inches.

9. The antenna mount of claim 1, wherein the mounting structure is a monopole.

10. The antenna mount of claim 9, wherein the monopole has a diameter in a range of about 8 inches to about 18 inches.

11. The antenna mount of claim 1, wherein the mount plate is hexagonal, circular, flower or star-shaped.

12. The antenna mount of claim 1, wherein the base plate comprises one central aperture and each support member is coupled adjacent to the periphery of the base plate surrounding the central aperture.

13. The antenna mount of claim 1, wherein the mount plate and the base plate are spaced apart a distance to allow one or more cables to be routed from the antenna to the mounting structure while maintaining a minimum bend radius of the cables.

14. An antenna mount assembly, comprising:

a mounting structure;

an antenna; and an antenna mount, the antenna mount comprising:

a mount plate;

a base plate, the base plate comprising one or more apertures, each aperture sized to receive a plurality of cables; and at least three support members, each support member having opposing ends, wherein one end is permanently coupled to the base plate and the other end is permanently coupled to the mount plate such that the base plate and the mount plate are spaced apart a distance, wherein the antenna is secured to the mount plate and the base plate is secured to the mounting structure and the plurality of cables run from the antenna through the one or more apertures in the base plate to the mounting structure, and wherein a transition cover surrounds the at least three support members and is secured to at least one of the at least three support members.

15. The antenna mount assembly of claim 14, wherein the antenna is secured to the mount plate via an antenna adapter bracket.

* * * * *